(No Model.)

C. W. HUNT.
MEASURING APPARATUS FOR COAL, &c.

No. 587,552. Patented Aug. 3, 1897.

WITNESSES:
C. W. Benjamin
Chas. E. Emery

INVENTOR
Charles W. Hunt
BY
Livingston Emery
ATTORNEY

UNITED STATES PATENT OFFICE.

CHARLES W. HUNT, OF WEST NEW BRIGHTON, NEW YORK.

MEASURING APPARATUS FOR COAL, &c.

SPECIFICATION forming part of Letters Patent No. 587,552, dated August 3, 1897.

Application filed August 10, 1894. Serial No. 519,922. (No model.)

*To all whom it may concern:*

Be it known that I, CHARLES W. HUNT, of West New Brighton, in the county of Richmond and State of New York, have invented a new and useful Measuring Apparatus for Coal or other Similar Substances, of which the following is a specification, reference being had to the accompanying drawings, forming a part of the same.

My invention has more particular reference to terminal spouts for chutes; and it consists of certain novel features of construction, combination of parts, and operative mechanism more fully described herein.

Figure 1:
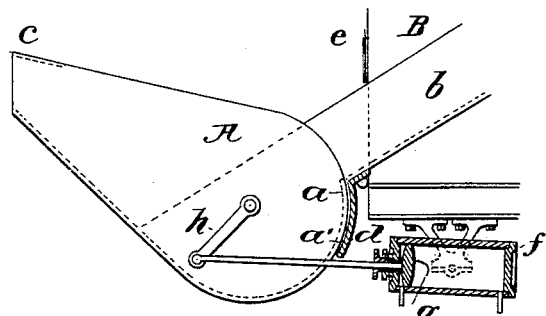
Figure 2:
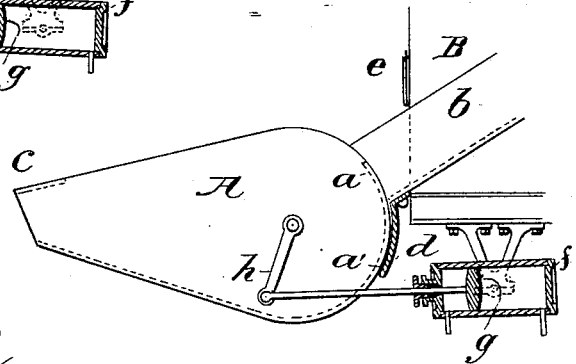
Figure 3:
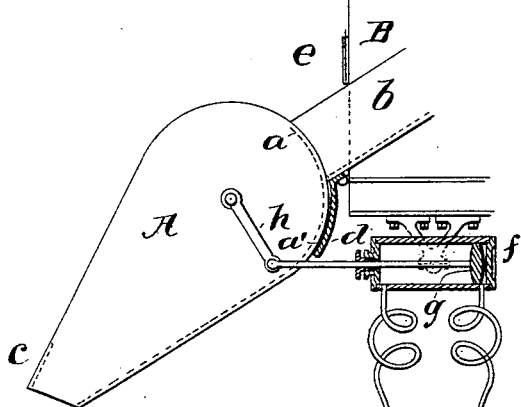
Figure 4:
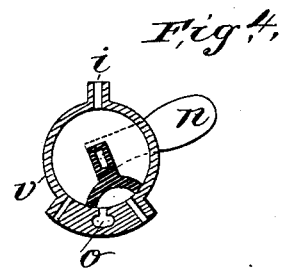

Referring to the drawings, Figures 1, 2, and 3 represent the measure in its various positions—*i. e.*, when filling, an intermediate position, and when dumping—and also show one form of operative mechanism. Fig. 4 is an enlarged sectional view of a form of operating-valve.

To more particularly describe my invention, A represents a measure or receiver suitably supported on trunnions or by its axis; B, a pocket or bin; *b*, a chute from the pocket or bin to the measure. The bin or pocket *b* is open on its upper side between the bin and the measure and has suitably attached to its under side an apron *d*, that conforms to the abutting shape of the measure. The receiver or measure is constructed with a semicylindrical or curved rear portion where it abuts against the mouth of the chute, and its forward end is extended to form a nose that facilitates dumping the material in the receiver. The receiver is open on its upper side and is usually provided with a brace *c* at its outlet end. The bottom of the measure extends upward on the rear or abutting portion, conforming to the cylindrical shape of the side portions, to a point *a*.

The cheeks of the measure, as I have said, are preferably curved or semicylindrical where they abut against the mouth of the inlet-chute, and may be secured together by means of a curved plate *a'*, the upper edge of which may be somewhat sharpened or rounded. This plate forms a back to the measure and at the same time, when the apparatus is in operation, acts as an obstacle-remover by cutting up through the substance and forcing obstructions out of its path as it ascends, and also acts as a gate to the chute *b* when in its uppermost position.

Suitably secured to the measure or receiver is an operating arm or lever, which may be operated by an oscillating cylinder *f* and piston *g*, as shown in the drawings. The piston may be operated by a valve *v*, inlet and outlet pipes *l* and *k*, each provided with suitable resiliency-loops to permit the oscillation of the cylinder. The valve *v* has an inlet *i* and outlet *o* and may be operated by a handle *n*. As the particular operative mechanism shown may have to be varied according to the position of the measuring apparatus, I do not wish to limit myself to its specific details.

*e* is a sliding gate that may be used, if desired, but has no connection with this invention.

The measure is preferably constructed with a capacity of about one ton and operates as follows: When the measure is in the position shown in Fig. 1, it is filling. When in the position shown in Fig. 2, it is still filling, but by the position of the back portion *a'* the inlet is contracted and the filling flow diminished. When in the position shown in Fig. 3, the filling flow is cut off and the measure is dumping. Thus the back *a'* cuts up through the coal or other substance, forcing any obstacle out of its path as it ascends, and also acts as a gate to entirely shut off the supply to the measure. Hence by this invention I am enabled to measure the coal and have an automatic means for preventing any obstacles from blocking the cut-off mechanism all operated by an external power.

The measures, in case they are to be used in filling locomotive-tenders, can be located so that the operative valve or device is within reach of the cab-window; or in case of cars or other receptacles, where it is necessary to load from several of these measures, a man can be stationed at a suitable point and operate all of the valves or other operative mechanism connected with the several measures either separately or in connection. A register can be suitably attached to the measure and the number of tons or other unit of measure adopted recorded automatically. In fact by my invention one man can operate the entire output of a pocket with great facility and can measure the amount of coal delivered.

Having now described my invention, what I claim, and desire to secure by Letters Patent, is—

1. In a measuring apparatus the combination of a measure and a valve, so arranged that the measure operates in unison with the movement of the valve.

2. In a measuring apparatus the combination of a measure having an extended back that operates as an obstacle-remover and gate, and a valve operating the said measure in unison with its own movement.

CHAS. W. HUNT. [L. S.]

Witnesses:
WM. F. HUNT,
HY. REMSEN RITCH.